UNITED STATES PATENT OFFICE.

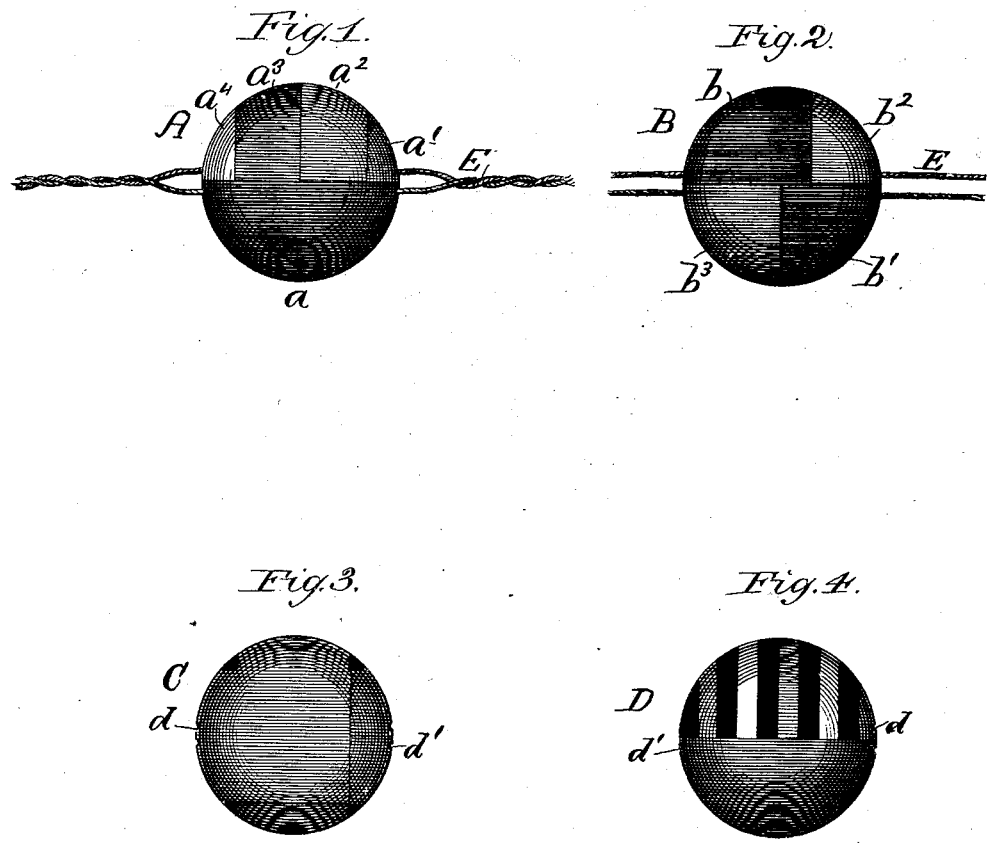

HOMER A. PLIMPTON, OF DENVER, COLORADO.

CHROMOSPHERE OR OPTICAL TOY.

SPECIFICATION forming part of Letters Patent No. 342,264, dated May 18, 1886.

Application filed March 3, 1885. Serial No. 157,606. (No model.)

*To all whom it may concern:*

Be it known that I, HOMER A. PLIMPTON, of Denver, county of Arapahoe, and State of Colorado, have invented certain new and useful Improvements in a Chromosphere or Optical Toy, of which the following is a full, clear, and exact description, that will enable others to make and use the same, reference being had to the accompanying drawings, forming a part of this specification.

This invention relates to an improvement in an optical toy, and the same consists of a spherical body or color-ball having two or more of the prime colors applied to the surface in division, and arranged in different relative positions, so that when the ball is made to revolve rapidly it will have the effect of causing one or more of the colors to fade away or blend into another or be displaced by another, thus producing a pleasing optical illusion.

The several figures in the drawings embody my improved features, showing balls representing different colors arranged in different planes.

Referring to the drawings, A, B, C, and D represent as many different balls or spheres, which will be, ordinarily, composed of wood; but any other material suitable for the purpose may be used—such as metal, glass, paper, leather, or rubber. We will suppose that the lower half, $a$, of the ball A (shown in Fig. 1) to be of a bright red color, and one of the upper quarters (not shown) to be black, while the remaining quarter of the sphere (shown in the upper foreground) is covered with a number of colors laid on in different planes. The triangular plane or surface $a'$ is a light blue, $a^2$ of light yellow, $a^3$ dark blue, and the plane $a^4$ a light cream tint. Now, when the ball is put in motion and caused to spin on its flexible axis or cord E, the combination of the red and black surfaces with the light blue has the effect of changing this part of the sphere into a continuous field of a light reddish tint, the plane $a^2$ becomes a continuous stripe or band of a dark, dull yellow, the plane $a^3$ presents a continuous stripe or band of dark red, and the plane $a^4$ is changed to a dark cream shade with a slight reddish cast. It will thus be observed that one of the predominating colors—viz., the black—is made to entirely disappear when the sphere is in motion by being blended with the other colors, the greater predominating color—viz., the red—being changed into circles of various shades, in accordance with the short stripe or plane connecting the red and black surfaces. In this case the six different colors or shades represented on the surface of the ball, when at rest, are reduced to four when in motion, and all of a different shade from any of the primary colors.

The surface of the ball B (shown in Fig. 2) is divided up into eighths, and may represent as many different colors or shades. The planes $b\ b'$ in this case are painted a dark blue, their opposites black; $b^2$, white, back of it yellow; $b^3$, red, back of it a light blue, thus representing six colors. When this ball is put in motion, a narrow black band or stripe is shown in the center, flanked by a dark yellow band on one side and on the other by a band of a dull red color, while the field on one side in the direction of the axis shows a dark cream tint and on the opposite a pink tint or shade.

The balls C and D (illustrated in Figs. 3 and 4) show a different arrangement of the colors, so disposed as to produce different variegated effects and transformations. The balls are provided with the central apertures, $d\ d'$, through which the double operating-cord is passed, the operation being similar to that of the ordinary buzz.

It will be readily seen that many different patterns may be produced by the arrangement and combination of the colors and the area of the surface covered by each color in relative proportion. When the ball is put into rapid motion, several patches of different colors are combined and show a continuous band, when none exists, of but one color, and that of a different color from any embraced in the combination, which effect is produced on the eye by the rapidity of motion not permitting the retina to take on the impression of each color separately. The same colors on the different balls also change, fade, and blend into different shades as the speed is increased or diminished, and the direction of the ball is reversed by the tension and relaxation on the operating-cord. This arrangement not only produces an amusing and interesting toy, but may also be turned to practical account by being employed to illustrate the effect of changeable and blended color-rays on the retina of the eye, and also to illustrate the infinite variety of hues and shades that it is possible to produce by the combination of colors, and, in this sense, might be termed a "philosophical toy." A spherical or similar body gives a much greater surface for the arrangement and combination of colors than a circular or flat disk of an equal diameter, as the whole of the surface is presented to view at the same time, thus producing more unique and pleasing designs than it is possible to obtain on a flat surface. I may also employ an oval or elongated body, or make use of any body having a different geometrical contour, to produce a pleasing effect; or I may use a ball having a corrugated surface.

For cheapness, simplicity, and durability I prefer a wooden ball having a painted surface laid on in regular or irregular planes; but the different colors may be changed by using pieces of colored paper, leather, &c., and attaching them to the surface of the ball by means of any suitable adhesive composition. Another effect may be obtained by providing a spherical surface with a woven or knitted covering composed of different-colored yarns or threads.

I am aware that whirligigs made of semicircular strips of metal joined together at their ends and having a space between each strip, so that when the device is whirled it will have a wave-like appearance that may be tinted by coloring the strips; that whirligigs formed of two or more strips, one of which is loose and having two or more contrasting colors arranged in curves radiating from the center and gradually approaching the periphery, and that whirligigs formed of a frame supporting a colored ball are all old, and none of these forms of whirligig is claimed. My device differs from those constructions in that my whirligig consists of a spherical body having prime colors arranged and disposed in divisions over the surface in such manner as to cause one or more of the colors to disappear or blend with the other colors when the ball is made to rapidly revolve, thereby producing different effects, colors, shades, or tints than are shown on the surface of the ball when at rest.

I am also aware that a disk having its surface divided into sections, and each section having curved stripes formed of different colors, so that when the device is whirled the colored face will present rings of different colors, is old, and that I do not claim. My device differs from that construction in that the idea is not to form tints of different colors from those upon the ball, but to make the stripes disappear in one place and reappear at another point, for which purpose a mutilated disk is placed upon the shaft of the device, whereas in my device the divisions are so formed that when revolved different colors from those upon the surface of the ball will appear. Furthermore, unless the mutilated disk be used, this result would not appear upon the disk, for the reason that all the colors would be before the operator. My device does not require a mutilated disk or an equivalent construction, as the body of my device is spherical, and only a semisphere is presented to the eye at one time.

Having thus described my invention, what I claim as new, and desire to secure by Letters Patent, is—

1. A spherical body having divisions, each of which has a prime color, and the divisions arranged over the surface of the ball, substantially as described, so that the color of one or more divisions will disappear or blend with the color of another division or divisions when the ball is revolved, thus producing colors, shades, or tints different from those of the prime colors, as set forth.

2. A spherical body having a number of divisions of different sizes and forms, each division having a color distinct from the others, and arranged, substantially as described, so that when the sphere is revolved a series of bands or stripes of different shades relative to each other will appear, said bands having no existence when said sphere is at rest.

3. As a new article of manufacture, an optical toy consisting of a sphere or ball having divisions, each of which has a prime color, and the divisions arranged over the surface of the ball, substantially as described, and central apertures passing through said ball, and a spinning-cord upon which said ball is mounted, as set forth.

HOMER A. PLIMPTON.

Witnesses:
   FRED T. SHELTON,
   HARRY HERRMANN.